US012563156B2

(12) United States Patent
Zhuang et al.

(10) Patent No.: US 12,563,156 B2
(45) Date of Patent: Feb. 24, 2026

(54) FRAME INTERPOLATION METHOD AND APPARATUS, AND ELECTRONIC DEVICE

(71) Applicant: VIVO MOBILE COMMUNICATION CO., LTD., Dongguan (CN)

(72) Inventors: Wenlong Zhuang, Dongguan (CN); Huicong Xu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/758,217

(22) Filed: Jun. 28, 2024

(65) Prior Publication Data

US 2024/0357055 A1 Oct. 24, 2024

Related U.S. Application Data

(63) Continuation of application No. PCT/CN2022/141576, filed on Dec. 23, 2022.

(30) Foreign Application Priority Data

Dec. 28, 2021 (CN) .......................... 202111626972.8

(51) Int. Cl.
| | |
|---|---|
| *H04N 7/01* | (2006.01) |
| *G06T 7/11* | (2017.01) |
| *G06V 10/25* | (2022.01) |
| *G06V 10/56* | (2022.01) |

(52) U.S. Cl.
CPC ............. *H04N 7/0135* (2013.01); *G06T 7/11* (2017.01); *G06V 10/25* (2022.01); *G06V 10/56* (2022.01)

(58) Field of Classification Search
USPC ......................................................... 386/230
See application file for complete search history.

(56) References Cited

U.S. PATENT DOCUMENTS

| | | | | |
|---|---|---|---|---|
| 2015/0264385 | A1 | 9/2015 | Ogawa | |
| 2020/0169692 | A1 | 5/2020 | Wang et al. | |
| 2021/0066507 | A1* | 3/2021 | Yamazaki | H10D 30/6734 |
| 2021/0082920 | A1* | 3/2021 | Nonaka | H10B 41/70 |
| 2021/0119054 | A1* | 4/2021 | Yamazaki | H10D 99/00 |
| 2021/0134801 | A1* | 5/2021 | Harada | H10D 30/6755 |
| 2021/0320209 | A1* | 10/2021 | Takahashi | H10D 99/00 |
| 2021/0367078 | A1* | 11/2021 | Yamazaki | H10D 62/80 |
| 2021/0385409 | A1 | 12/2021 | Li | |
| 2021/0399134 | A1* | 12/2021 | Yamazaki | H01L 23/485 |

FOREIGN PATENT DOCUMENTS

| | | |
|---|---|---|
| CN | 110933497 A | 3/2020 |
| CN | 111277779 A | 6/2020 |
| CN | 111327908 A | 6/2020 |
| CN | 111327959 A | 6/2020 |
| CN | 111356026 A | 6/2020 |
| CN | 113014936 A | 6/2021 |
| CN | 114339313 A | 4/2022 |
| WO | 2021175054 A1 | 9/2021 |

* cited by examiner

*Primary Examiner* — Nigar Chowdhury
(74) *Attorney, Agent, or Firm* — The Webb Law Firm

(57) ABSTRACT

A frame interpolation method includes in a case that the AP master chip obtains a video surface of a to-be-displayed target video, performing area division on the video surface, to obtain M areas, where M is an integer greater than 1; determining a frame interpolation area from the M areas according to whether there is UI surface coverage in the video surface; and performing, by the independent frame interpolation chip, frame interpolation processing on the frame interpolation area.

17 Claims, 7 Drawing Sheets

In a case that an AP master chip obtains a video surface of a to-be-displayed target video, an electronic device performs area division on the video surface, to obtain M areas    ⌐ 201

The electronic device determines a frame interpolation area from the M areas according to whether there is UI surface coverage in the video surface    ⌐ 202

An independent frame interpolation chip performs frame interpolation processing on the frame interpolation area    ⌐ 203

FIG. 1

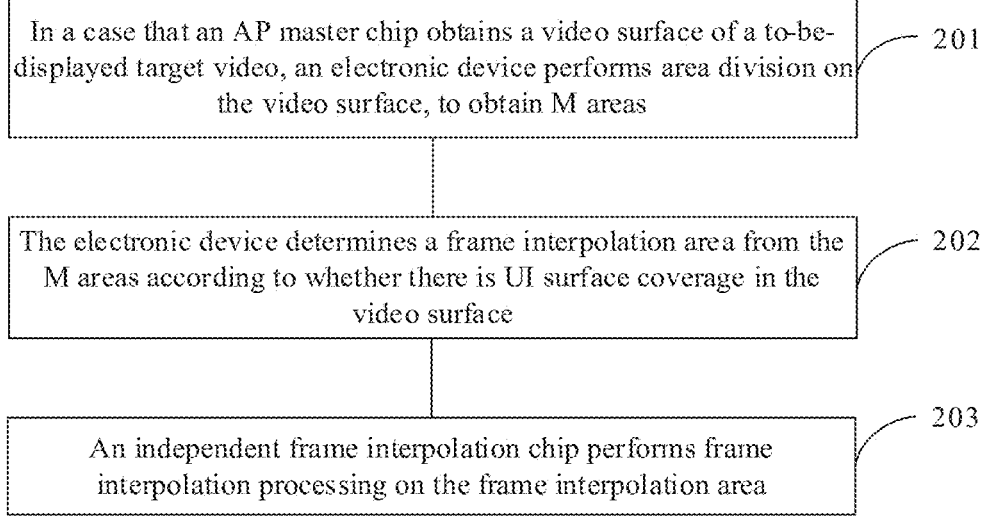

FIG. 2

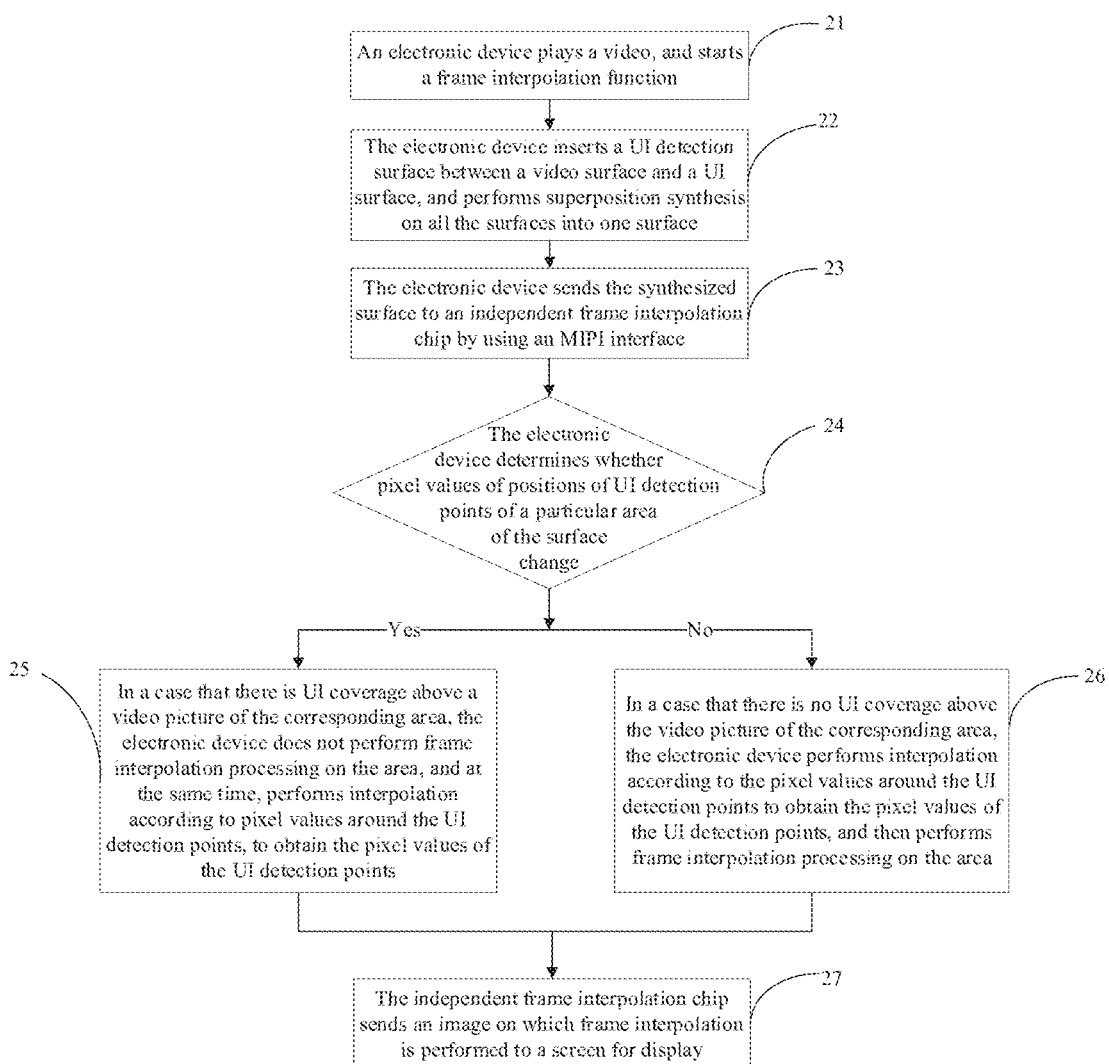

An electronic device plays a video, and starts a frame interpolation function — 21

The electronic device inserts a UI detection surface between a video surface and a UI surface, and performs superposition synthesis on all the surfaces into one surface — 22

The electronic device sends the synthesized surface to an independent frame interpolation chip by using an MIPI interface — 23

The electronic device determines whether pixel values of positions of UI detection points of a particular area of the surface change — 24

Yes — No

25 — In a case that there is UI coverage above a video picture of the corresponding area, the electronic device does not perform frame interpolation processing on the area, and at the same time, performs interpolation according to pixel values around the UI detection points, to obtain the pixel values of the UI detection points 26 — In a case that there is no UI coverage above the video picture of the corresponding area, the electronic device performs interpolation according to the pixel values around the UI detection points to obtain the pixel values of the UI detection points, and then performs frame interpolation processing on the area The independent frame interpolation chip sends an image on which frame interpolation is performed to a screen for display — 27

FRAME INTERPOLATION METHOD AND APPARATUS, AND ELECTRONIC DEVICE

CROSS-REFERENCE TO RELATED APPLICATIONS

This application is a Bypass Continuation Application of International Patent Application No. PCT/CN2022/141576, filed Dec. 23, 2022, and claims priority to Chinese Patent Application No. 202111626972.8, filed Dec. 28, 2021, the disclosures of which are hereby incorporated by reference in their entireties.

BACKGROUND OF THE INVENTION

Field of the Invention

This application pertains to the field of communication technologies, and relates to a frame interpolation method and apparatus, and an electronic device.

Description of Related Art

A picture displayed in a screen of an electronic device usually includes a plurality of surfaces, but a finally displayed picture is a surface obtained through surface superposition processing by the electronic device on the plurality of surfaces. Therefore, when displaying a video, if the electronic device needs to display another dynamic user interface (UI) surface (for example, a bullet screen or an advertisement), a change of the dynamic UI surface may affect motion calculation by the electronic device for a video surface, greatly affecting effect of frame interpolation on the video. Consequently, definition and fluency of video playing by the electronic device become worse.

SUMMARY OF THE INVENTION

Embodiments of this application provide a frame interpolation method and apparatus, and an electronic device.

According to a first aspect, an embodiment of this application provides a frame interpolation method, applied to an electronic device, where the electronic device includes an application processor AP master chip and an independent frame interpolation chip, and the method includes: in a case that the AP master chip obtains a video surface of a to-be-displayed target video, performing area division on the video surface, to obtain M areas, where M is an integer greater than 1; determining a frame interpolation area from the M areas according to whether there is UI surface coverage in the video surface; and performing, by the independent frame interpolation chip, frame interpolation processing on the frame interpolation area.

According to a second aspect, an embodiment of this application provides a frame interpolation apparatus, where the frame interpolation apparatus includes: a division module, a determining module, and a processing module. The division module is configured to: in a case that an AP master chip obtains a video surface of a to-be-displayed target video, perform division on the video surface, to obtain M areas, where M is an integer greater than 1. The determining module is configured to determine a frame interpolation area from the M areas according to whether there is UI surface coverage in the video surface. The processing module is configured to perform frame interpolation processing on the frame interpolation area.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method according to the first aspect are implemented.

According to a fourth aspect, an embodiment of this application provides a non-transitory readable storage medium. The non-transitory readable storage medium stores a program or an instruction, where when the program or the instruction is executed by a processor, the steps of the method according to the first aspect are implemented.

According to a fifth aspect, an embodiment of this application provides a chip. The chip includes a processor and a communication interface, the communication interface is coupled to the processor, and the processor is configured to run a program or an instruction to implement the method according to the first aspect.

According to a sixth aspect, an embodiment of this application provides a computer program product. The program product is stored in a non-transitory storage medium, and the program product is executed by at least one processor to implement the method according to the first aspect.

BRIEF DESCRIPTION OF THE DRAWINGS

FIG. 1 is a schematic diagram of a frame interpolation method according to an embodiment of this application;

FIG. 2 is a first schematic diagram of an example of a frame interpolation method according to an embodiment of this application;

FIG. 7 is a sixth schematic diagram of an example of a frame interpolation method according to an embodiment of this application;

DESCRIPTION OF THE INVENTION

Figure 3:
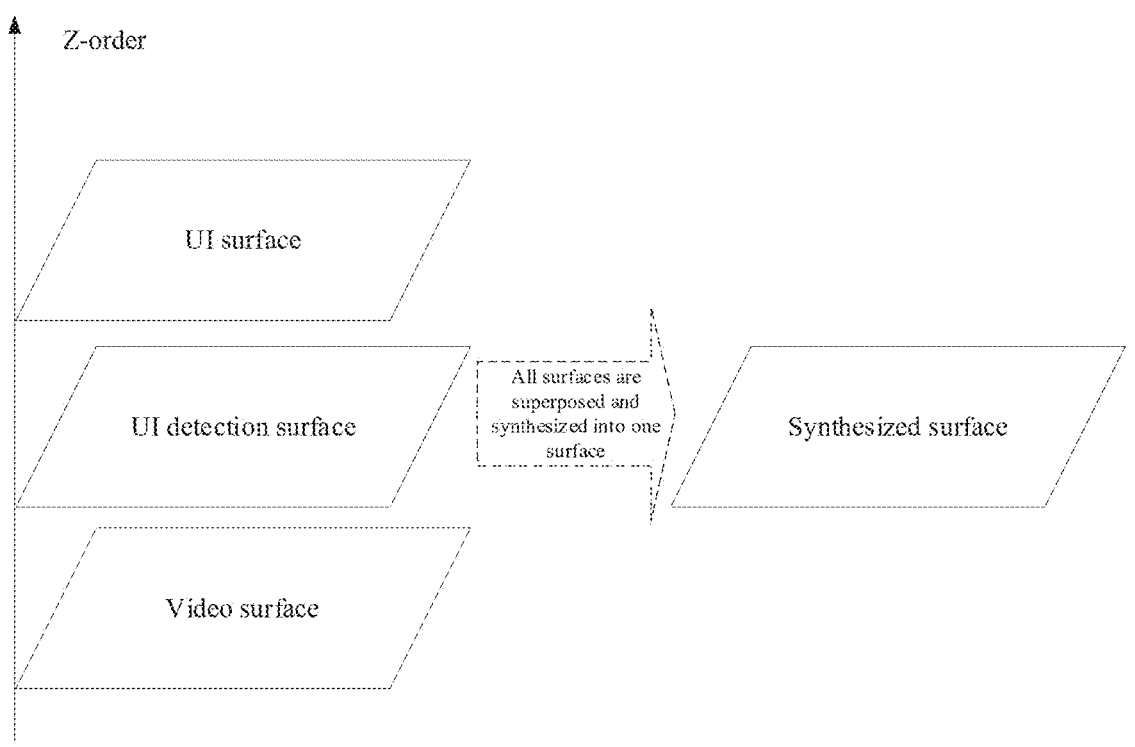
FIG. 3 is a second schematic diagram of an example of a frame interpolation method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, a frame interpolation method provided in embodiments of this application is described by using some embodiments and an application scenario of the embodiments.

At present, to improve fluency of video displaying by an electronic device, a frame interpolation manner is usually used for videos. To be specific, new picture content is calculated between two frames of pictures, and a motion trajectory of an object in the picture is predicted, so that the electronic device can increase, by using a motion compensation technology, a quantity of frames of a video with a relatively small quantity of frames by using a frame interpolation method. For example, a 24-frame film is updated to a film with 60 or even more frames in a video frame interpolation manner, so as to improve fluency of film displaying.

A video picture in the electronic device is usually divided into many surfaces. However, what is ultimately displayed in a screen display area of the electronic device is a picture obtained by superposing all the surfaces of the video. When a video application plays a video, the video application not only displays a video picture surface, but may also display another UI surface in the video surface, for example, a bullet screen, a message pop-up, a control, a station label, an advertisement, or the like. These UI surfaces are usually displayed above the video surface, and some of the UI surfaces also include transparency (Alpha).

However, the electronic device usually processes a to-be-displayed video in a YUV format, where the YUV format consists of three parts: Y, U, and V, Y represents luminance (Luminance or Luma), and U and V represent chromaticity of colors. A UI image is processed in an ARGB format, where the ARGB format consists of A, R, G, and B, where A represents transparency, red, green, and blue. In addition, when the electronic device superposes the video surface and the UI surface for synthesis, the electronic device usually first converts the YUV video surface into the ARGB format, and then superposes the video surface in the ARGB format with the UI surface for synthesis, and converts all surfaces into the ARGB format during superposition, to obtain a surface in an RGB format that does not include Alpha, where the RGB format consists of R, G, and B.

Therefore, when the electronic device performs superposition synthesis processing on the to-be-displayed video, if the UI surface changes, especially the UI surface including Alpha changes, it is very likely to affect motion calculation of the electronic device for a video surface picture. As a result, the change of the UI surface also affects processing effect of the electronic device for video frame interpolation, affecting fluency and definition of video displaying by the electronic device.

In the embodiments of this application, the electronic device may divide a video surface corresponding to a target video in a case of obtaining the video surface of the to-be-displayed target video, to obtain M areas, where M is an integer greater than 1, and then determine a frame interpolation area from the M areas according to whether there is UI surface coverage in the video surface; and an independent frame interpolation chip performs frame interpolation processing on the frame interpolation area. In this solution, the electronic device may divide the video surface corresponding to the target video into a plurality of areas in a case of displaying the video surface of the target video, and determine, from the plurality of areas, the area in which frame interpolation needs to be performed, and then the electronic device may directly perform frame interpolation processing on the area in which frame interpolation needs to be performed. Therefore, when requiring to display the UI surface, the electronic device may perform frame interpolation processing only on an area not covered by the UI surface, to avoid a problem that effect of displaying the video surface by the electronic device is poor due to the UI surface. In this way, when power consumption of the electronic device is reduced and effect of video displaying by the electronic device is improved, definition and fluency of video playing by the electronic device are also improved.

In the embodiments of this application, an independent frame interpolation chip is added between a master chip and a display screen of the electronic device, to perform frame interpolation processing on the to-be-displayed video by using the independent frame interpolation chip. To be specific, after the to-be-displayed video is sent to the independent frame interpolation chip, frame interpolation processing is first performed on the to-be-displayed video, and then the video on which frame interpolation processing is performed is sent to a screen display area of the electronic device for display.

An embodiment of this application provides a frame interpolation method, applied to an electronic device, where the electronic device includes an application processor AP master chip and an independent frame interpolation chip. FIG. 1 is a flowchart of a frame interpolation method according to an embodiment of this application. As shown in FIG. 1, the frame interpolation method provided in this embodiment of this application may include the following step 201 to step 203.

Step 201: In a case that an AP master chip obtains a video surface of a to-be-displayed target video, the electronic device performs area division on the video surface, to obtain M areas.

M is an integer greater than 1.

In this embodiment of this application, when the electronic device plays the target video, if a frame interpolation function is not started, when processing the target video, the application processor (AP) master chip directly synthesizes the video surface and a UI surface, and then sends a synthesized surface to the independent frame interpolation chip, so that the independent frame interpolation chip bypasses (bypass) to send the synthesized surface to a screen display area of the electronic device for display; or if the frame interpolation function is started, the electronic device enters a frame interpolation working mode.

Optionally, in this embodiment of this application, the target video may include a plurality of surfaces, for example, the video surface and the UI surface.

Optionally, in this embodiment of this application, the UI surface may include any one of the following: a bullet screen, a message pop-up, a video control, a television station label, an application trademark, an advertisement, and the like.

Optionally, in this embodiment of this application, the electronic device may divide the video surface of the target video into a plurality of areas, such as dividing the video surface into A×B areas, that is, dividing the video surface into A rows and B columns to obtain M areas, where A×B=M, and A and B are both integers greater than 1.

Step 202: The electronic device determines a frame interpolation area from the M areas according to whether there is UI surface coverage in the video surface.

In this embodiment of this application, the electronic device may determine, by using the independent frame interpolation chip, whether there is UI surface coverage in the video surface, to determine the frame interpolation area from the M areas.

Step 203: The independent frame interpolation chip performs frame interpolation processing on the frame interpolation area.

In this embodiment of this application, the electronic device sends the processed target video to the display screen of the electronic device for display after the independent frame interpolation chip performs frame interpolation processing on the target video.

Optionally, in this embodiment of this application, in a first implementation of this embodiment of this application, the foregoing step 201 may be implemented by using steps 201a to 201d described below.

Step 201a: The AP master chip obtains the to-be-displayed video surface and a UI surface that is displayed on the to-be-displayed video surface.

In this embodiment of this application, the electronic device may obtain, by using the AP master chip, the to-be-displayed video surface and the UI surface that is displayed on the to-be-displayed video surface.

Step 201b: The AP master chip inserts a UI detection surface between the video surface and the UI surface, and performs area division on the screen display area by using the UI detection surface, to obtain X areas.

In this embodiment of this application, each of the X areas is an area in the screen display area, and X is a positive integer greater than 1.

Optionally, in this embodiment of this application, the AP master chip may first perform area division on the screen display area by using the UI detection surface, to obtain the X areas.

In this embodiment of this application, the UI detection surface includes UI detection points, and the AP master chip may set a UI detection point in each area when dividing the screen area by using the UI detection surface, and obtain an initial value for each UI detection point.

For example, using an example in which the electronic device is a mobile phone, as shown in FIG. 2, the mobile phone divides the screen display area into a plurality of areas, and equally divides each area into four small areas, where a center point of each small area is a UI detection point, and colors of these four detection points are pure black, pure white, pure white, pure black, respectively. Four detection points within the first area A1 in the upper left corner are pixels A11, A12, A13, and A14 respectively, and ARGB values of A11, A12, A13, and A14 are 0xff000000, 0xffffffff, 0xffffffff, and 0xff000000 respectively. Values of all pixels other than the UI detection points are all full-transparent pixel values (0x00000000).

Step 201c: The AP master chip performs synthesis processing on the video surface, the UI surface, and the UI detection surface, to obtain a first surface.

In this embodiment of this application, the electronic device may process the target video by using the AP master chip, where in a case that the screen display area includes the video surface and the UI surface displayed on the video surface, a UI detection surface is inserted between the video surface and the UI surface, where a display resolution of the UI detection surface is consistent with that of the screen of the electronic device.

Optionally, in this embodiment of this application, the foregoing step 201b may be implemented by using the following step 201b1.

Step 201c1: The AP master chip performs synthesis processing on the video surface and the UI detection surface by using a preset algorithm, to obtain a second surface, and performs synthesis processing on the second surface and the UI surface by using the preset algorithm, to obtain the first surface.

Optionally, in this embodiment of this application, the AP master chip places the video surface at the bottom layer, places the UI detection surface at the middle layer, places the UI surface at the top layer, and scales resolutions of the video surface and the UI surface to resolutions adapted to be displayed on the screen, so as to enable the AP master chip to synthesize the video surface, the UI surface, and the UI detection surface, to obtain the first surface.

In this embodiment of this application, the first surface is a surface obtained through synthesis processing on the video surface, the UI surface, and the UI detection surface.

For example, as shown in FIG. 3, when the mobile phone synthesizes the video surface, the UI surface, and the UI detection surface, the mobile phone may place the video surface at the bottom layer of a Z-axis order, place the UI detection surface at the middle layer of the Z-axis order, place the UI surface at the top layer of the Z-axis order, and superposes and synthesizes all the surfaces into one surface, that is, the first surface (that is, the surface obtained through synthesis).

In this embodiment of this application, the electronic device may set the video surface to a background image (Background pixel color, Cb) and set the UI detection surface to a foreground image (Foreground pixel color, Cf), so that the electronic device can perform synthesis processing on the video surface and the UI detection surface by using the preset algorithm, to obtain the second surface.

Optionally, in this embodiment of this application, the electronic device may perform synthesis processing on the video surface and the UI detection surface by using an Alpha mixed superposition formula, and calculate pixel values obtained after superposition synthesis is performed on the video surface and the UI detection surface, to obtain the second surface obtained through superposition synthesis.

It should be noted that, performing surface superposition on surfaces means that, Alpha mixed superposition calculation is separately performed on a plurality of surfaces in the Z-axis order of the surfaces in an ARGB format from top to bottom, to obtain the mixed surface. An image at the top layer in the Z-axis order is the foreground image, an image at the bottom layer in the Z-axis order is the background image, and RGB values of each pixel after superposition synthesis are calculated based on ARGB values of the foreground image and ARGB values of the background image according to the mixed formula.

It should be noted that the Alpha mixed superposition formula is: $Cr=a\times Cf+(1-a)\times Cb$, where Cr is a result pixel color (Result pixel color, Cr), and a is a ratio of an Alpha value (Af) of the foreground pixel color to a color depth; and RGB values of Cf include Rf, Gf, and Bf; RGB values of Cb include Rb, Gb, and Bb; and RGB values of Cr include Rr, Gr and Br.

Figure 4:
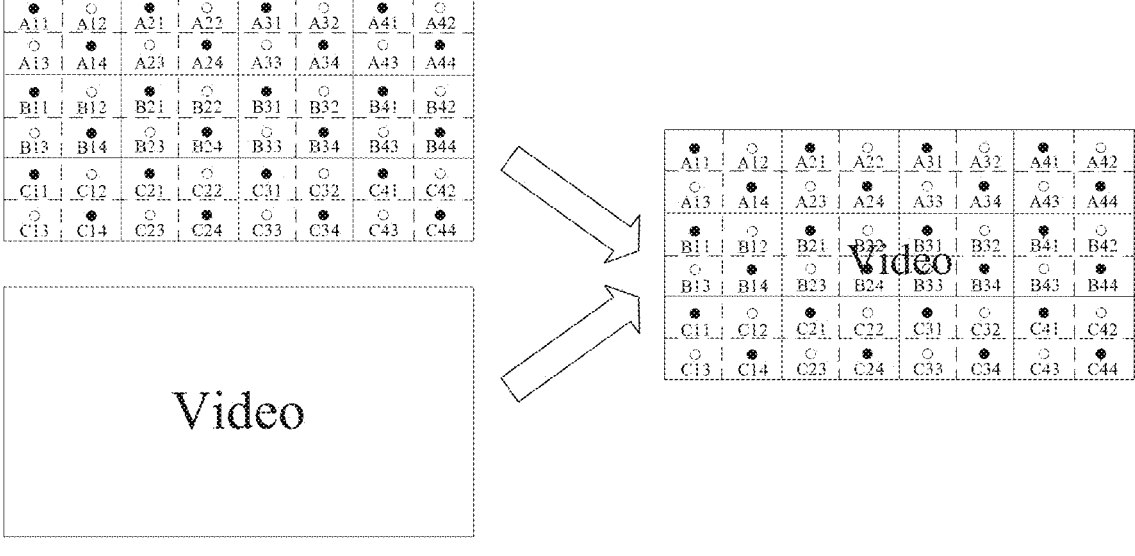
FIG. 4 is a third schematic diagram of an example of a frame interpolation method according to an embodiment of this application.

For example, with reference to FIG. 2, as shown in FIG. 4, in a case that Alpha is completely opaque, that is, a=1, a pixel value obtained after superposition is Cr=1×Cf+0× Cb=Cf, to be specific, the pixel value of the second surface obtained after synthesis is overwritten with the pixel value of the UI detection surface. To be specific, A11 and A14 are pure black, and A12 and A13 are pure white. In a case that Alpha is completely transparent, that is, a=0, a pixel value obtained after superposition is Cr=0×Cf+1×Cb=Cb, to be specific, the pixel value of the second surface obtained after synthesis is retained as the pixel value of the video surface, and the mobile phone may perform superposition synthesis on the video surface and the UI detection surface, to obtain the second surface.

In this embodiment of this application, the second surface is a surface obtained through mixed superposition on the video surface and the UI detection surface.

Optionally, in this embodiment of this application, the electronic device may perform synthesis processing on the second surface and the UI surface by using the Alpha mixed superposition formula, and calculate pixel values obtained after superposition synthesis is performed on the second surface and the UI detection surface, to obtain the first surface obtained through superposition synthesis.

Optionally, in this embodiment of this application, after the electronic device performs Alpha superposition on the second surface and the UI surface to obtain the first surface, pixel values of an area that is in the first surface and that is covered by the UI surface are changed, and pixel values of an area that is in the first surface and that is not covered by the UI surface are maintained at pixel values before super-position mixing is performed.

Figure 5:
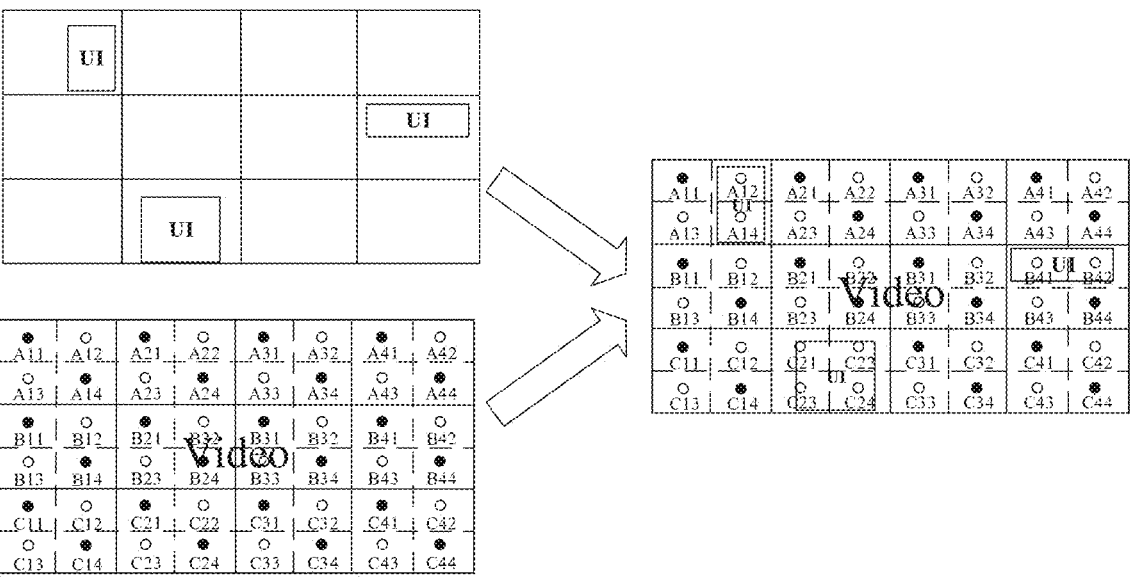
FIG. 5 is a fourth schematic diagram of an example of a frame interpolation method according to an embodiment of this application.

For example, with reference to FIG. 2, as shown in FIG. 5, the mobile phone may first perform synthesis superposi-tion processing on the video surface and the UI detection surface, and then perform Alpha superposition processing with the UI surface. If there is UI surface coverage above the video surface, after superposition, pixel values of UI detec-tion points in areas that are of the video surface and that are covered by the UI surface will change to other pixel values, including the pixel values of the UI detection points (pixel colors of points A12, B42, C22, and C23 change from all white to colors obtained after superposition is performed with the UI surface, and pixel colors of points A14, B41, C21, and C24 change from all black to colors obtained after superposition is performed with the UI surface). If there is no UI surface coverage above the video surface, after superposition, the pixel values of the UI detection points in the areas of the video surface without UI surface coverage still remain at previous pixel values. The mobile phone may perform superposition synthesis on the second surface and the UI surface, to obtain the first surface.

In this embodiment of this application, the electronic device may first perform superposition processing on the video surface and UI detection surface by using the preset algorithm, and may obtain pixel values of the surface when obtaining the surface obtained through superposition pro-cessing, so that the electronic device can determine whether there is UI surface coverage in the video surface according to the pixel values. Therefore, when the electronic device performs superposition synthesis on a plurality of surfaces, changes in pixel values of the synthesized image can be calculated more accurately. In this way, impact of the UI surface on the target video is alleviated, and effect and action for surface superposition synthesis by the electronic device are optimized.

Step 201*d*: The independent frame interpolation chip performs area division on the first surface, to obtain the M areas.

In this embodiment of this application, each of the M areas is an area in the first surface.

Optionally, in this embodiment of this application, M is equal to X (for example, in a case of full-screen display of the video surface); or M is not equal to X (for example, in a case of centered and non-full-screen display of the video surface).

In this embodiment of this application, the electronic device may divide and process the screen display area into the X areas by using the UI detection surface, and map the X areas of the screen display area onto the video surface, and then the electronic device may divide the first surface to be displayed on the screen display area into the M areas by using the independent frame interpolation chip, where each of the M areas is an area in the first surface.

In this embodiment of this application, the electronic device may insert the UI detection surface between the video surface and the UI surface, so that the electronic device synthesizes the video surface, the UI surface, and the UI detection surface into one surface, namely, the first surface, and then the electronic device may divide the screen display area according to the UI detection surface, so as to divide the first surface into the M areas. Therefore, the electronic device may perform different processing on different areas, for example, performs frame interpolation processing or performs non-frame-interpolation processing. In this way, power consumption of the electronic device is reduced, and accuracy of frame interpolation processing performed by the electronic device on the target video is also improved.

Optionally, in this embodiment of this application, the UI detection surface includes N UI detection points, each of the M areas includes at least one UI detection point in the N UI detection points, and the foregoing step 202 may be imple-mented by using step 202*a* described below, and the fore-going step 203 may be implemented by using step 203*a* described below.

Step 202*a*: The independent frame interpolation chip determines a first target area in the M areas as a frame interpolation area.

In this embodiment of this application, the first target area is an area in which a pixel color value of at least one UI detection point meets a preset condition in the M areas, and the preset condition is that: the pixel color value of the at least one UI detection point matches an initial value of a pixel value of the at least one UI detection point.

It should be noted that, that the pixel color value of the at least one UI detection point matches the initial value of the pixel value of the at least one UI detection point means that, attribute information at a position corresponding to a UI detection point at the first surface obtained after mixed superposition processing is performed matches attribute information of a UI detection point at the UI detection surface before mixed superposition processing is performed.

Optionally, in this embodiment of this application, the foregoing attribute information includes a pixel value, a pixel color, a pixel position, a pixel color temperature, pixel luminance, and the like, so that the electronic device can determine, according to the pixel information, whether a particular area is covered by the UI surface.

In this embodiment of this application, the first target area is an area in which pixel color values of a plurality of UI detection points meet the preset condition in the M areas.

Optionally, in this embodiment of this application, the first target area may include one or more areas.

Optionally, in this embodiment of this application, the electronic device may divide the screen display area into the M areas by using the UI detection surface, so as to set four UI detection points in each area, that is, to equally divide one area into four small areas, and place the four detection points respectively at center point positions of the four small areas. Pixel colors of the four UI detection points are pure black, pure white, pure white, and pure black respectively. Then, the independent frame interpolation chip may detect, according to four UI detection points corresponding to each area of the first surface, whether the pixel colors of the four UI detection points are pure black, pure white, pure white, and pure black respectively. If a pixel value of any one of the UI detection points in the area does not match, it indicates that there is UI coverage or UI superposition in the area. In addition, because pixel information at positions of the UI detection points is not original pixel values obtained after superposition is performed on the video surface and the UI surface, the electronic device needs to perform interpolation according to adjacent pixel values around the UI detection points, to obtain the original pixel values. If the pixel values of all the four UI detection points in the area match, it indicates that there is no UI coverage or UI superposition in the area, and these areas are determined as the first target area, namely, the frame interpolation area. The electronic device may recover pixel values of all UI detection points in all areas of the whole frame of image by using an interpolation algorithm, and then finally perform frame interpolation processing on an area on which frame interpolation can be performed.

In this embodiment of this application, the electronic device may determine areas that require frame interpolation and that are in the M areas based on the plurality of UI detection points, and perform frame interpolation on these areas. Therefore, the electronic device does not need to perform frame interpolation processing on invalid area for frame interpolations, and only needs to perform frame interpolation processing on areas without UI superposition. In this way, power consumption of frame interpolation by the electronic device is reduced, a processing speed of frame interpolation performed by the electronic device on the video is improved, and accuracy of UI detection is also improved.

Figure 6:
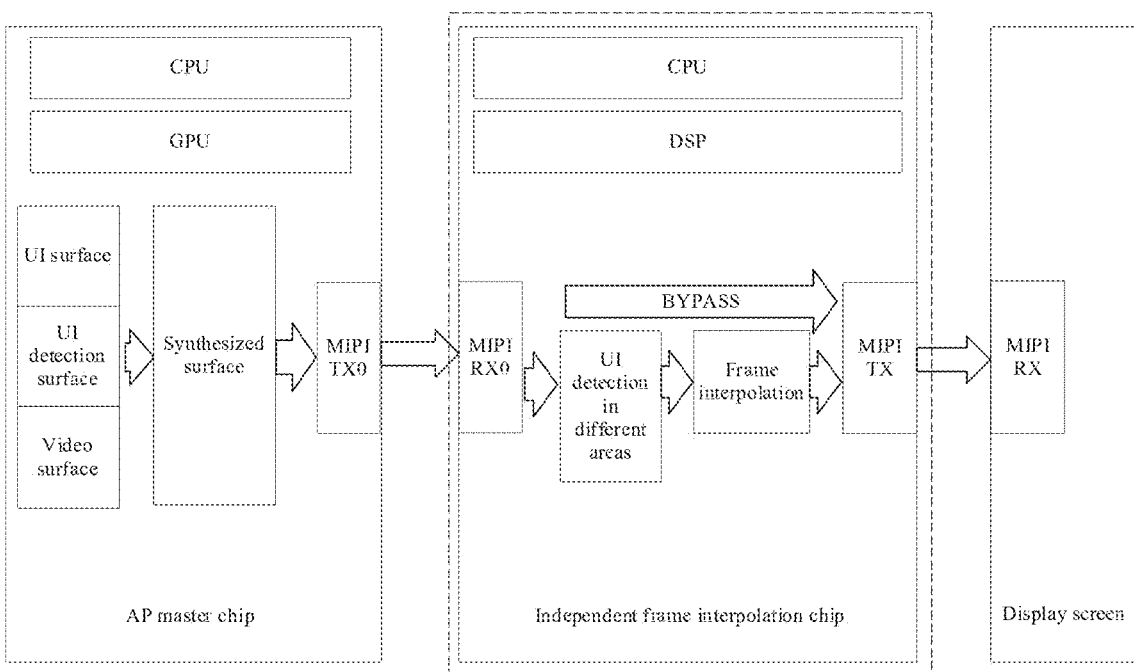
FIG. 6 is a fifth schematic diagram of an example of a frame interpolation method according to an embodiment of this application.

Optionally, as shown in FIG. 6, in the first implementation described above, the electronic device includes the AP master chip, the independent frame interpolation chip, and the display screen, where the AP master chip includes a central processing unit (CPU) and a graphics processing unit (GPU), and the independent frame interpolation chip includes a CPU and a digital signal processor (DSP). When a user chooses to play the video and starts the frame interpolation function of the electronic device, the electronic device may insert a UI detection surface between the video surface and the UI surface by using the AP master chip, and then perform superposition synthesis on all the surfaces into one surface, that is, the first surface, and send the first surface to a receive interface (Receive) of an MIPI of the independent frame interpolation chip by using a transmit interface (TX) of a mobile industry processor interface (MIPI). Then the AP master chip may divide the screen display area into the plurality of areas, so that the electronic device determines, according to positions of UI detection points of a particular area of the first surface, whether pixel values of the area corresponding to the UI detecting points change, to determine areas in which pixel values do not change, and determine these areas as areas on which frame interpolation processing needs to be performed. In a case that some areas of the video surface (for example, the first target area) are not covered by the UI surface, the electronic device performs frame interpolation according to pixel values around UI detection points, to obtain pixel values of the UI detection points, and then perform frame interpolation processing on the first target area. In a case that other areas of the video surface (for example, areas other than the first target area in the M areas) are covered by the UI surface, the electronic device does not perform frame interpolation processing on these areas, and at the same time, performs interpolation according to pixel values around UI detection points, to obtain pixel values of the UI detection points. After the independent frame interpolation chip performs frame interpolation processing on the frame interpolation area, the target video on which frame interpolation processing is performed may be sent to the receive interface of the MIPI of the display screen by using the transmit interface of the MIPI, and the target video on which frame interpolation processing is performed is displayed in the screen display area.

Figure 8:
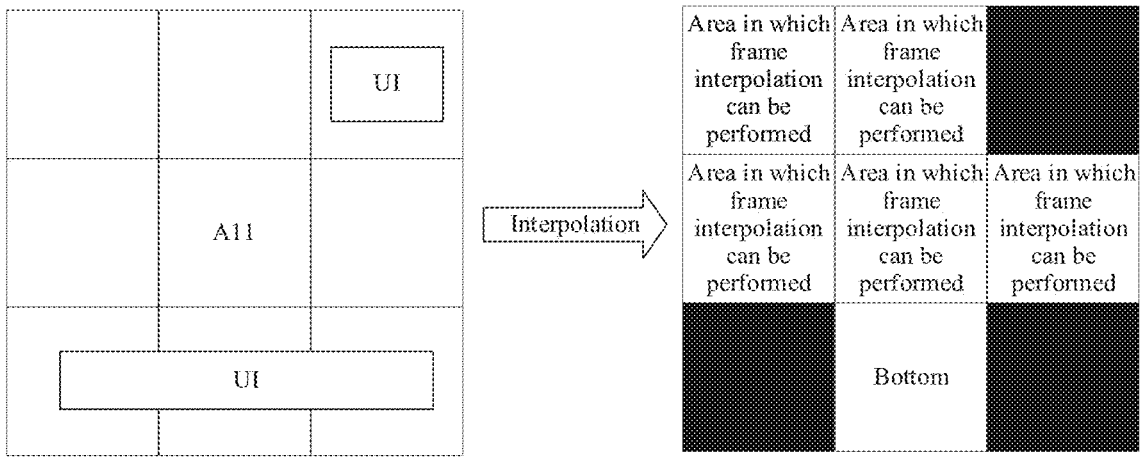
FIG. 8 is a schematic flowchart of a frame interpolation method according to an embodiment of this application.

FIG. 7 is a flowchart of the foregoing first frame interpolation method according to an embodiment of this application. As shown in FIG. 8, the first frame interpolation method provided in this embodiment of this application may include the following step 21 to step 25 and step 27, or step 21 to step 24 and step 26 and step 27.

Step 21: The electronic device plays the video, and starts the frame interpolation function.

Step 22: The electronic device inserts a UI detection surface between the video surface and the UI surface, and performs superposition synthesis on all the surfaces into one surface.

Step 23: The electronic device sends the synthesized surface to the independent frame interpolation chip by using the MIPI interface.

Step 24: The electronic device determines whether pixel values of positions of UI detection points of a particular area of the surface change.

Step 25: In a case that there is UI coverage above a video picture of the corresponding area, the electronic device does not perform frame interpolation processing on the area, and at the same time, performs interpolation according to pixel values around the UI detection points, to obtain the pixel values of the UI detection points.

Step 26: In a case that there is no UI coverage above the video picture of the corresponding area, the electronic device performs interpolation according to the pixel values around the UI detection points to obtain the pixel values of the UI detection points, and then performs frame interpolation processing on the area.

Step 27: The independent frame interpolation chip sends an image on which frame interpolation is performed to the screen for display.

In this embodiment of this application, the electronic device may divide the screen display area into the plurality of areas by using the UI detection technology, and detect the plurality of areas of the target video, to determine whether there is UI superposition in an area in the plurality of areas, and perform frame interpolation processing only on an area without UI superposition. Therefore, impact of the UI surface on the effect of frame interpolation performed by the electronic device is alleviated, and frame interpolation power consumption caused by frame interpolation processing on invalid areas is also reduced, and a processing speed of frame interpolation performed by the electronic device on the plurality of areas is also improved.

Step 203a: The independent frame interpolation chip performs frame interpolation processing on the first target area.

In this embodiment of this application, the independent frame interpolation chip may determine the frame interpolation area (namely, the first target area) from the M areas, and then perform frame interpolation processing on the first target area.

Optionally, in the second implementation of this embodiment of this application, the frame interpolation method provided by the electronic device further includes the following step 401. Step 401: The AP master chip stores a video surface white list supporting a frame interpolation function, and determines, according to the video surface white list, whether there is UI surface coverage in the video surface.

Optionally, in this embodiment of this application, the electronic device may pre-store, by using the AP master chip, the video surface white list of all video applications that support the frame interpolation function, and determine a surface that is not in the white list as the UI surface, and then divide the screen display area corresponding to the target video in a case of displaying the video surface of the target video, to obtain the M areas.

In this embodiment of this application, the electronic device may pre-store a white list locally, and determine, according to the white list, whether there is UI surface coverage in the video surface. In this way, efficiency and flexibility of frame interpolation performed by the electronic device on the target video are improved. In addition, in the second implementation of this embodiment of this application, the foregoing step 201 may be implemented by using the following steps 201e to 201g.

Step 201e: The AP master chip obtains the to-be-displayed video surface and a UI surface that is displayed on the to-be-displayed video surface.

Optionally, in this embodiment of this application, the electronic device may obtain, by using the AP master chip, the to-be-displayed video surface and the UI surface that is displayed on the to-be-displayed video surface.

Step 201f: The AP master chip performs area division on the screen display area, to obtain Y areas.

In this embodiment of this application, each of the Y areas is an area in the screen display area, and Y is a positive integer greater than 1.

Optionally, in this embodiment of this application, the electronic device may divide the screen display area by using the AP master chip, to obtain the Y areas. For an implementation, reference may be made to the first implementation in this embodiment of this application.

Step 201g: The AP master chip performs area division on the video surface, to obtain the M areas.

In this embodiment of this application, each of the M areas is an area in the video surface.

Optionally, in this embodiment of this application, M is equal to Y (for example, in a case of full-screen display of the video surface); or M is not equal to Y (for example, in a case of centered and non-full-screen display of the video surface).

Optionally, in this embodiment of this application, the electronic device may divide the screen display area by using the AP master chip, to obtain the Y areas. For an implementation, reference may be made to the first implementation in this embodiment of this application.

Optionally, in this embodiment of this application, the foregoing step 202 may be implemented by using the following step 202b, and the foregoing step 203 may be implemented by using the following step 203b.

Step 202b: In a case that the UI surface is displayed on the video surface displayed in the AP master chip, a second target area in the M areas is determined as the frame interpolation area according to attribute information of the UI surface.

Optionally, in this embodiment of this application, the second target area is an area in which there is no overlapping between the video surface and the UI surface and that is in the M areas, and the attribute information of the UI surface includes a position and an area of the UI surface on the video surface.

Optionally, in this embodiment of this application, the attribute information of the UI surface includes the position and the area of the UI surface on the video surface, namely, information about an overlapping area between the UI surface and the video surface.

Optionally, in this embodiment of this application, the information about the overlapping area includes position coordinates of the overlapping area, pixel values of the overlapping area, luminance values of the overlapping area, saturation of the overlapping area, color temperature of the overlapping area, and the like, so that the electronic device can determine a status of overlapping between the M areas and the UI surface according to the information about the overlapping area.

Optionally, in this embodiment of this application, the second target area may include one or more areas.

Optionally, in this embodiment of this application, the foregoing overlapping may include partial overlapping or complete overlapping. To be specific, in a case that the second target area in the M areas partially overlaps the UI surface, the second target area in the M areas is determined as the frame interpolation area; or in a case that the second target area in the M areas completely overlaps the UI surface, the M areas are determined as the second target area.

Optionally, in this embodiment of this application, the electronic device may determine, by using the AP master chip according to overlapping positions between the M areas and the UI surface, and an area of the overlapping area, the second target area in the M areas, and determine the second target area as the frame interpolation area.

For example, as shown in FIG. 8, the mobile phone may mark, according to overlapping positions between the video surface and the UI surface, and the area of the overlapping area, an area in which the video surface is superposed with the UI surface, that is, mark the area as an invalid area for frame interpolation, and mark an area in which the video surface is not superposed with the UI surface, that is, mark the area as an area in which frame interpolation can be performed.

In this embodiment of this application, the electronic device may determine an area that does not overlap the UI surface and that is in the M areas as the frame interpolation area in the M areas in a case of displaying the UI surface on the video surface. Therefore, processing by the electronic device on the invalid area for frame interpolation is reduced, so that power consumption of the electronic device is reduced, and efficiency of performing frame interpolation processing on the video by the electronic device is improved.

Figure 9:
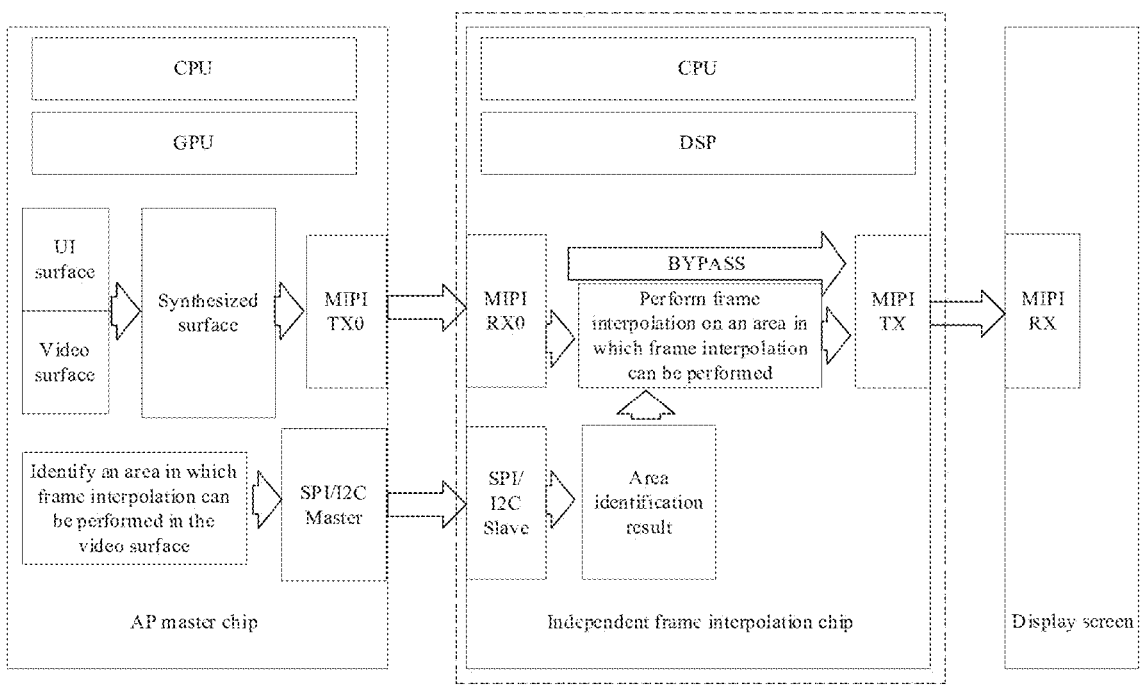
FIG. 9 is a seventh schematic diagram of an example of a frame interpolation method according to an embodiment of this application.

Optionally, as shown in FIG. 9, in the second implementation described above, the electronic device includes the AP master chip, the independent frame interpolation chip, and the display screen, where the AP master chip includes a central processing unit (CPU) and a graphics processing unit (GPU), and the independent frame interpolation chip includes a CPU and a digital signal processor (DSP). When a user chooses to play the video and starts the frame interpolation function of the electronic device, the electronic device may pre-store the video surface white list in the AP master chip, to detect whether the video surface is covered by the UI surface. The electronic device performs superposition synthesis on the video surface and the UI surface, sends the surface obtained through superposition synthesis to the receive interface of the MIPI of the independent frame interpolation chip by using the transmit interface of the MIPI, and divides the video surface into the plurality of areas when there is a non-white-list surface (that is, the UI surface) on the video surface, so that the plurality of areas of the surface can be marked according to a position and a size of the UI surface, so as to mark the area in which frame interpolation can be performed and the invalid area for frame interpolation. To be specific, the area that does not overlap the UI surface and that is in the video surface is marked as the area in which frame interpolation can be performed, that is, the second target area, and the area that overlaps the UI surface and that is in the video surface is marked as the invalid area for frame interpolation, and a marking result is sent to the independent frame interpolation chip by using a serial peripheral interface (SPI), so that the independent frame interpolation chip can receive the marking result by using the SPI interface and perform frame interpolation processing on the second target area according to the marking result. Then the processed video is sent to the receive interface of the MIPI of the display screen by using the transmit interface of the MIPI, so that the target video on which frame interpolation processing is performed is displayed in the screen display area.

In this embodiment of this application, the electronic device may directly identify, on the side of the master chip according to the pre-stored video surface white list, the area in which frame interpolation can be performed, that is, the area not covered by the UI surface, and then the independent frame interpolation chip performs frame interpolation processing only on the area in which frame interpolation can be performed. Therefore, the method for detecting the UI surface by the electronic device is simplified, and when efficiency of frame interpolation performed by the electronic device on the target video is improved, power consumption of the electronic device is reduced and effect of frame interpolation performed by the electronic device on the target video is improved.

Step 203*a*: The independent frame interpolation chip determines the frame interpolation area from the M areas according to the second target area, and performs frame interpolation processing on the frame interpolation area.

In this embodiment of this application, the electronic device may determine, by using the independent frame interpolation chip according to the second target area, the frame interpolation area from the M areas, and perform frame interpolation processing on the frame interpolation area.

This embodiment of this application provides a frame interpolation method. The electronic device may divide the video surface corresponding to the target video in a case of displaying the video surface of the target video, to obtain M areas, where M is an integer greater than 1, and then determine the frame interpolation area from the M areas according to whether there is UI surface coverage in the video surface; and the independent frame interpolation chip performs frame interpolation processing on the frame interpolation area. In this solution, the electronic device may divide the video surface corresponding to the target video into a plurality of areas in a case of displaying the video surface of the target video, and determine, from the plurality of areas, the area in which frame interpolation needs to be performed, and then the electronic device may directly perform frame interpolation processing on the area in which frame interpolation needs to be performed. Therefore, when requiring to display the UI surface, the electronic device may perform frame interpolation processing only on an area not covered by the UI surface, to avoid a problem that effect of displaying the video surface by the electronic device is poor due to the UI surface. In this way, when power consumption of the electronic device is reduced and effect of video displaying by the electronic device is improved, definition and fluency of video playing by the electronic device are also improved.

It should be noted that, the frame interpolation method provided in this embodiment of this application may be performed by an electronic device, a frame interpolation apparatus, or a control module in the frame interpolation apparatus for performing the frame interpolation method. In this embodiment of this application, the frame interpolation method provided in this embodiment of this application is described by using an example in which the terminal device performs the frame interpolation method.

Figure 10:
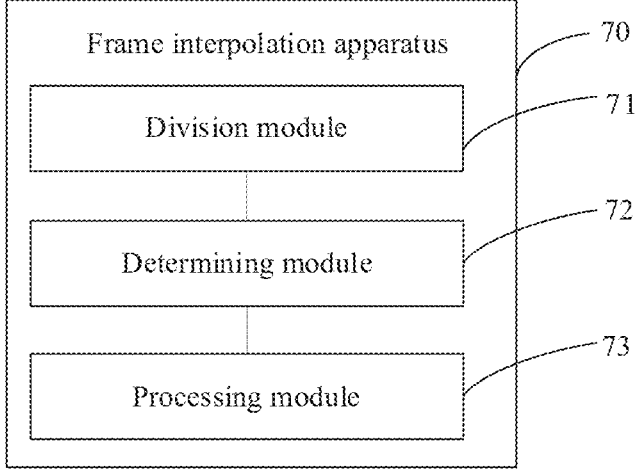
FIG. 10 is a schematic structural diagram of a frame interpolation apparatus according to an embodiment of this application.

FIG. 10 is a possible schematic structural diagram of a frame interpolation apparatus according to an embodiment of this application. As shown in FIG. 10, the frame interpolation apparatus 70 may include: a division module 71, a determining module 72, and a processing module 73.

The division module 71 is configured to: in a case that an AP master chip obtains a video surface of a to-be-displayed target video, perform division on the video surface, to obtain M areas, where M is an integer greater than 1. The determining module 72 is configured to determine a frame interpolation area from the M areas according to whether there is UI surface coverage in the video surface. The processing module 73 is configured to perform frame interpolation processing on the frame interpolation area.

This embodiment of this application provides a frame interpolation apparatus. The electronic device may divide the video surface corresponding to the target video into a plurality of areas in a case of displaying the video surface of the target video, and determine, from the plurality of areas, the area in which frame interpolation needs to be performed, and then the electronic device may directly perform frame interpolation processing on the area in which frame interpolation needs to be performed. Therefore, when requiring to display the UI surface, the electronic device may perform frame interpolation processing only on an area not covered by the UI surface, to avoid a problem that effect of displaying the video surface by the electronic device is poor due to the UI surface. In this way, when power consumption of the electronic device is reduced and effect of video displaying by the electronic device is improved, definition and fluency of video playing by the electronic device are also improved.

In a possible implementation, the division module 71 is configured to: obtain the to-be-displayed video surface and a UI surface that is displayed on the to-be-displayed video surface; insert a UI detection surface between the video surface and the UI surface, and perform area division on a screen display area by using the UI detection surface, to obtain X areas, where each of the X areas is an area in the screen display area, and X is a positive integer greater than 1; perform synthesis processing on the video surface, the UI surface, and the UI detection surface, to obtain a first surface; and perform area division on the first surface, to obtain the M areas, where each of the M areas is an area in the first surface.

In a possible implementation, the division module 71 is configured to: perform synthesis processing on the video surface and the UI detection surface by using a preset algorithm, to obtain a second surface, and perform synthesis processing on the second surface and the UI surface by using the preset algorithm, to obtain the first surface.

In a possible implementation, the UI detection surface includes N UI detection points, and each of the M areas includes at least one UI detection point in the N UI detection points. The determining module 72 is configured to determine a first target area in the M areas as the frame interpolation area, where the first target area is an area in which a pixel color value of at least one UI detection point meets a preset condition in the M areas, and the preset condition is that: the pixel color value of the at least one UI detection point matches an initial value of a pixel value of the at least one UI detection point. The processing module 73 is configured to perform frame interpolation processing on the first target area.

In a possible implementation, the division module 71 is configured to: obtain the to-be-displayed video surface and a UI surface that is displayed on the to-be-displayed video surface; perform area division on a screen display area, to obtain Y areas, where each of the Y areas is an area in the screen display area, and Y is a positive integer greater than 1; and perform area division on the video surface, to obtain the M areas, where each of the M areas is an area in the video surface.

In a possible implementation, the determining module 72 is configured to: in a case that the UI surface is displayed on the video surface displayed in the AP master chip, determine a second target area in the M areas as the frame interpolation area according to attribute information of the UI surface, where the second target area is an area in which there is no overlapping between the video surface and the UI surface and that is in the M areas, and the attribute information of the UI surface includes a position and an area of the UI surface on the video surface. The processing module 73 is configured to: determine the frame interpolation area from the M areas according to the second target area, and perform frame interpolation processing on the frame interpolation area.

In a possible implementation, the processing module 73 is further configured to: store a video surface white list supporting a frame interpolation function, and determine, according to the video surface white list, whether there is UI surface coverage in the video surface.

The frame interpolation apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, a self-service machine, or the like. This is not specifically limited in this embodiment of this application.

The frame interpolation apparatus in this embodiment of this application may be an apparatus with an operating system. The operating system may be an Android operating system, may be an iOS operating system, or may be another possible operating system. This is not specifically limited in this embodiment of this application.

The frame interpolation apparatus provided in this embodiment of this application can implement the processes implemented in the foregoing method embodiment, and can achieve same technical effect. To avoid repetition, details are not described herein again.

Figure 11:
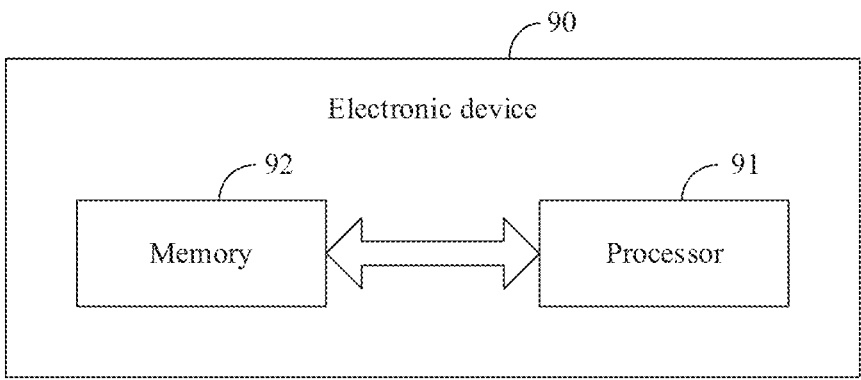
FIG. 11 is a first schematic diagram of a hardware structure of an electronic device according to an embodiment of this application.

Optionally, as shown in FIG. 11, an embodiment of this application further provides an electronic device 90, including a processor 91, a memory 92, and a program or an instruction that is stored in the memory 92 and that can be run on the processor 91. When the program or the instruction is executed by the processor 91, the processes of the foregoing method embodiment are implemented, with the same technical effect achieved. To avoid repetition, details are not described herein again.

It should be noted that the electronic device in this embodiment of this application includes the foregoing mobile electronic device and the foregoing non-mobile electronic device.

Figure 12:
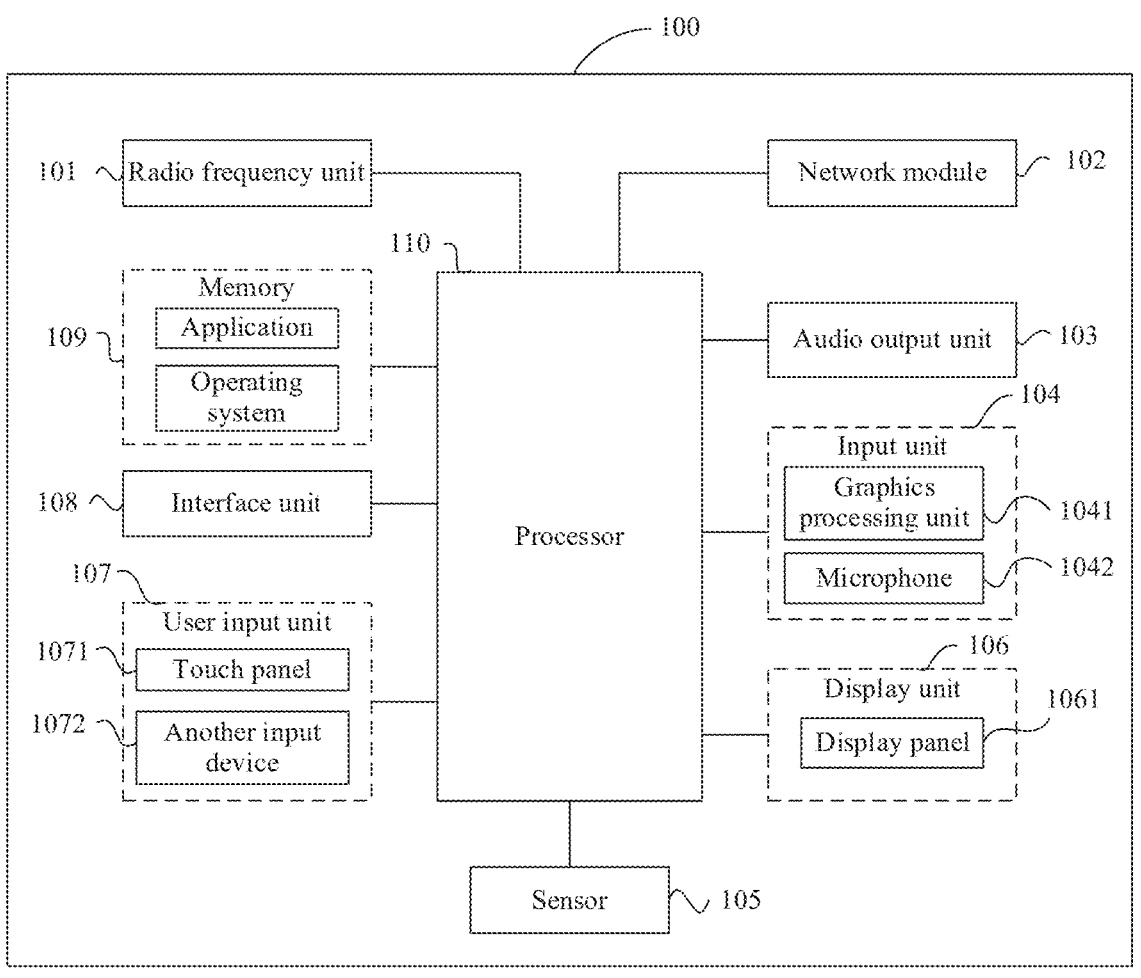
FIG. 12 is a second schematic diagram of a hardware structure of an electronic device according to an embodiment of this application.

FIG. 12 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power management system, to implement functions such as charging and discharging management, and power consumption management by using the power management system. The structure of the electronic device shown in FIG. 13 does not constitute a limitation on the electronic device. The electronic device may include components more or fewer than those shown in the diagram, a combination of some components, or different component arrangements. Details are not described herein.

The processor 110 is configured to: in a case that an AP master chip obtains a video surface of a to-be-displayed target video, perform division on the video surface, to obtain M areas, where M is an integer greater than 1; determine a frame interpolation area from the M areas according to whether there is UI surface coverage in the video surface; and perform frame interpolation processing on the frame interpolation area.

This embodiment of this application provides an electronic device. The electronic device may divide the video surface corresponding to the target video into a plurality of areas in a case of displaying the video surface of the target video, and determine, from the plurality of areas, the area in which frame interpolation needs to be performed, and then the electronic device may directly perform frame interpolation processing on the area in which frame interpolation needs to be performed. Therefore, when requiring to display the UI surface, the electronic device may perform frame interpolation processing only on an area not covered by the UI surface, to avoid a problem that effect of displaying the video surface by the electronic device is poor due to the UI surface. In this way, when power consumption of the electronic device is reduced and effect of video displaying by the electronic device is improved, definition and fluency of video playing by the electronic device are also improved.

Optionally, in this embodiment of this application, the processor 110 is configured to: obtain the to-be-displayed video surface and a UI surface that is displayed on the to-be-displayed video surface; insert a UI detection surface between the video surface and the UI surface, and perform area division on a screen display area by using the UI detection surface, to obtain X areas, where each of the X areas is an area in the screen display area, and X is a positive integer greater than 1; perform synthesis processing on the video surface, the UI surface, and the UI detection surface, to obtain a first surface; and perform area division on the first surface, to obtain the M areas, where each of the M areas is an area in the first surface.

Optionally, in this embodiment of this application, the processor 110 is configured to: perform synthesis processing on the video surface and the UI detection surface by using a preset algorithm, to obtain a second surface, and perform synthesis processing on the second surface and the UI surface by using the preset algorithm, to obtain the first surface.

Optionally, in this embodiment of this application, the UI detection surface includes N UI detection points, and each of the M areas includes at least one UI detection point in the N UI detection points. The processor 110 is configured to: determine a first target area in the M areas as the frame interpolation area, where the first target area is an area in which a pixel color value of at least one UI detection point meets a preset condition in the M areas, and the preset condition is that: the pixel color value of the at least one UI detection point matches an initial value of a pixel value of the at least one UI detection point; and perform frame interpolation processing on the first target area.

Optionally, in this embodiment of this application, the processor 110 is configured to: obtain the to-be-displayed video surface and a UI surface that is displayed on the to-be-displayed video surface; perform area division on a screen display area, to obtain Y areas, where each of the Y areas is an area in the screen display area, and Y is a positive integer greater than 1; and perform area division on the video surface, to obtain the M areas, where each of the M areas is an area in the video surface.

Optionally, in this embodiment of this application, the processor 110 is configured to: in a case that the UI surface is displayed on the video surface displayed in the AP master chip, determine a second target area in the M areas as the frame interpolation area according to attribute information of the UI surface, where the second target area is an area in which there is no overlapping between the video surface and the UI surface and that is in the M areas, and the attribute information of the UI surface includes a position and an area of the UI surface on the video surface; and determine the frame interpolation area from the M areas according to the second target area, and perform frame interpolation processing on the frame interpolation area.

Optionally, in this embodiment of this application, the processor 110 is further configured to: store a video surface white list supporting a frame interpolation function, and determine, according to the video surface white list, whether there is UI surface coverage in the video surface.

The electronic device provided in this embodiment of this application can implement the processes of the foregoing method embodiment, with the same technical effect achieved. To avoid repetition, details are not described herein again.

For beneficial effect of the implementations in this embodiment, refer to the beneficial effect of the corresponding implementations in the foregoing method embodiment. To avoid repetition, details are not described herein again.

It should be understood that in this embodiment of this application, the input unit 104 may include a graphics processing unit (GPU) 1041 and a microphone 1042. The graphics processing unit 1041 processes image data of a static picture or a video obtained by an image capture apparatus (for example, a camera) in a video capture mode or an image capture mode. The display unit 106 may include a display panel 1061. The display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It may be understood that, the modem processor may alternatively not be integrated into the processor 110.

An embodiment of this application further provides a non-transitory readable storage medium. The non-transitory readable storage medium stores a program or an instruction. When the program or the instruction is executed by a processor, the processes of the foregoing method embodiment are implemented, and same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or a compact disc.

An embodiment of this application further provides a chip. The chip includes a processor and a communication interface, the communication interface is coupled to the processor, and the processor is configured to run a program or an instruction to implement the processes of the foregoing method embodiment, and same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application provides a computer program product. The program product is stored in a non-transitory storage medium, and the program product is executed by at least one processor to implement the processes of the foregoing frame interpolation method embodiment, and same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a non-transitory storage medium (such as a ROM/RAM, a magnetic disk, or a compact disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A frame interpolation method, applied to an electronic device, wherein the electronic device comprises an application processor (AP) master chip and an independent frame interpolation chip, wherein the method comprises:

in a case that the AP master chip obtains a video surface of a to-be-displayed target video, performing area division on the video surface, to obtain M areas, wherein M is an integer greater than 1;

determining a frame interpolation area from the M areas according to whether there is user interface (UI) surface coverage in the video surface; and performing, by the independent frame interpolation chip, frame interpolation processing on the frame interpolation area; wherein in the case that the AP master chip obtains a video surface of a to-be-displayed target video, performing area division on the video surface, to obtain M areas comprises:

obtaining, by the AP master chip, a to-be-displayed video surface and a UI surface that is displayed on the to-be-displayed video surface;

inserting, by the AP master chip, a UI detection surface between the video surface and the UI surface, and performing area division on a screen display area by using the UI detection surface, to obtain X areas, wherein each of the X areas is an area in the screen display area, and X is a positive integer greater than 1;

performing, by the AP master chip, synthesis processing on the video surface, the UI surface, and the UI detection surface, to obtain a first surface; and performing, by the independent frame interpolation chip, area division on the first surface, to obtain the M areas, wherein each of the M areas is an area in the first surface.

2. The method according to claim 1, wherein the performing synthesis processing on the video surface, the UI surface, and the UI detection surface, to obtain a first surface comprises:

performing, by the AP master chip, synthesis processing on the video surface and the UI detection surface by using a preset algorithm, to obtain a second surface, and performing synthesis processing on the second surface and the UI surface by using the preset algorithm, to obtain the first surface.

3. The method according to claim 2, wherein the UI detection surface comprises N UI detection points, and each of the M areas comprises at least one UI detection point in the N UI detection points;

the determining a frame interpolation area from the M areas according to whether there is UI surface coverage in the video surface comprises:

determining, by the independent frame interpolation chip, a first target area in the M areas as the frame interpolation area, wherein the first target area is an area in which a pixel color value of at least one UI detection point meets a preset condition in the M areas, and the preset condition is that: the pixel color value of the at least one UI detection point matches an initial value of a pixel value of the at least one UI detection point; and the performing, by the independent frame interpolation chip, frame interpolation processing on the frame interpolation area comprises:

performing, by the independent frame interpolation chip, frame interpolation processing on the first target area.

4. The method according to claim 1, wherein in a case that the AP master chip obtains a video surface of a to-be-displayed target video, performing area division on the video surface, to obtain the M areas comprises:

obtaining, by the AP master chip, the to-be-displayed video surface and a UI surface that is displayed on the to-be-displayed video surface;

performing, by the AP master chip, area division on a screen display area, to obtain Y areas, wherein each of the Y areas is an area in the screen display area, and Y is a positive integer greater than 1; and performing, by the AP master chip, area division on the video surface, to obtain the M areas, wherein each of the M areas is an area in the video surface.

5. The method according to claim 1, wherein the determining a frame interpolation area from the M areas according to whether there is UI surface coverage in the video surface comprises:

in a case that the UI surface is displayed on the video surface displayed in the AP master chip, determining a second target area in the M areas as the frame interpolation area according to attribute information of the UI surface, wherein the second target area is an area in which there is no overlapping between the video surface and the UI surface and that is in the M areas, and the attribute information of the UI surface comprises a position and an area of the UI surface on the video surface; and the performing, by the independent frame interpolation chip, frame interpolation processing on the frame interpolation area comprises:

determining, by the independent frame interpolation chip, the frame interpolation area from the M areas according to the second target area, and performing frame interpolation processing on the frame interpolation area.

6. The method according to claim 5, wherein the method further comprises:

storing, by the AP master chip, a video surface white list supporting a frame interpolation function, and determining, according to the video surface white list, whether there is UI surface coverage in the video surface.

7. An electronic device, comprising an application processor (AP) master chip, an independent frame interpolation chip, a processor, a memory, and a program or an instruction that is stored in the memory and executable on the processor, wherein the program or the instruction, when executed by the processor, causes the electronic device to perform:

in a case that the AP master chip obtains a video surface of a to-be-displayed target video, performing area division on the video surface, to obtain M areas, wherein M is an integer greater than 1;

determining a frame interpolation area from the M areas according to whether there is user interface (UI) surface coverage in the video surface;

performing, by the independent frame interpolation chip, frame interpolation processing on the frame interpolation area;

obtaining, by the AP master chip, a to-be-displayed video surface and a UI surface that is displayed on the to-be-displayed video surface;

inserting, by the AP master chip, a UI detection surface between the video surface and the UI surface, and performing area division on a screen display area by using the UI detection surface, to obtain X areas, wherein each of the X areas is an area in the screen display area, and X is a positive integer greater than 1;

performing, by the AP master chip, synthesis processing on the video surface, the UI surface, and the UI detection surface, to obtain a first surface; and performing, by the independent frame interpolation chip, area division on the first surface, to obtain the M areas, wherein each of the M areas is an area in the first surface.

8. The electronic device according to claim 7, wherein the program or the instruction, when executed by the processor, causes the electronic device to perform:

performing, by the AP master chip, synthesis processing on the video surface and the UI detection surface by using a preset algorithm, to obtain a second surface, and performing synthesis processing on the second surface and the UI surface by using the preset algorithm, to obtain the first surface.

9. The electronic device according to claim 8, wherein the UI detection surface comprises N UI detection points, and each of the M areas comprises at least one UI detection point in the N UI detection points; and the program or the instruction, when executed by the processor, causes the electronic device to perform:

determining, by the independent frame interpolation chip, a first target area in the M areas as the frame interpolation area, wherein the first target area is an area in which a pixel color value of at least one UI detection point meets a preset condition in the M areas, and the preset condition is that: the pixel color value of the at least one UI detection point matches an initial value of a pixel value of the at least one UI detection point; and the program or the instruction, when executed by the processor, causes the electronic device to perform:

performing, by the independent frame interpolation chip, frame interpolation processing on the first target area.

10. The electronic device according to claim 7, wherein the program or the instruction, when executed by the processor, causes the electronic device to perform:

obtaining, by the AP master chip, the to-be-displayed video surface and a UI surface that is displayed on the to-be-displayed video surface;

performing, by the AP master chip, area division on a screen display area, to obtain Y areas, wherein each of the Y areas is an area in the screen display area, and Y is a positive integer greater than 1; and performing, by the AP master chip, area division on the video surface, to obtain the M areas, wherein each of the M areas is an area in the video surface.

11. The electronic device according to claim 7, wherein the program or the instruction, when executed by the processor, causes the electronic device to perform:

in a case that the UI surface is displayed on the video surface displayed in the AP master chip, determining a second target area in the M areas as the frame interpolation area according to attribute information of the UI surface, wherein the second target area is an area in which there is no overlapping between the video surface and the UI surface and that is in the M areas, and the attribute information of the UI surface comprises a position and an area of the UI surface on the video surface; and the program or the instruction, when executed by the processor, causes the electronic device to perform:

determining, by the independent frame interpolation chip, the frame interpolation area from the M areas according to the second target area, and performing frame interpolation processing on the frame interpolation area.

12. The electronic device according to claim 11, wherein the program or the instruction, when executed by the processor, causes the electronic device to further perform:

storing, by the AP master chip, a video surface white list supporting a frame interpolation function, and determining, according to the video surface white list, whether there is UI surface coverage in the video surface.

13. A non-transitory readable storage medium, wherein the non-transitory readable storage medium stores a program or an instruction, and the program or the instruction, when executed by a processor of an electronic device comprising an application processor (AP) master chip and an independent frame interpolation chip, causes the electronic device to perform:

in a case that the AP master chip obtains a video surface of a to-be-displayed target video, performing area division on the video surface, to obtain M areas, wherein M is an integer greater than 1;

determining a frame interpolation area from the M areas according to whether there is user interface (UI) surface coverage in the video surface;

performing, by the independent frame interpolation chip, frame interpolation processing on the frame interpolation area;

obtaining, by the AP master chip, a to-be-displayed video surface and a UI surface that is displayed on the to-be-displayed video surface;

inserting, by the AP master chip, a UI detection surface between the video surface and the UI surface, and performing area division on a screen display area by using the UI detection surface, to obtain X areas, wherein each of the X areas is an area in the screen display area, and X is a positive integer greater than 1;

performing, by the AP master chip, synthesis processing on the video surface, the UI surface, and the UI detection surface, to obtain a first surface; and performing, by the independent frame interpolation chip, area division on the first surface, to obtain the M areas, wherein each of the M areas is an area in the first surface.

14. The non-transitory readable storage medium according to claim 13, wherein the program or the instruction, when executed by the processor, causes the electronic device to perform:

performing, by the AP master chip, synthesis processing on the video surface and the UI detection surface by using a preset algorithm, to obtain a second surface, and performing synthesis processing on the second surface and the UI surface by using the preset algorithm, to obtain the first surface.

15. The non-transitory readable storage medium according to claim 14, wherein the UI detection surface comprises N UI detection points, and each of the M areas comprises at least one UI detection point in the N UI detection points; and the program or the instruction, when executed by the processor, causes the electronic device to perform:

determining, by the independent frame interpolation chip, a first target area in the M areas as the frame interpolation area, wherein the first target area is an area in which a pixel color value of at least one UI detection point meets a preset condition in the M areas, and the preset condition is that: the pixel color value of the at least one UI detection point matches an initial value of a pixel value of the at least one UI detection point; and the program or the instruction, when executed by the processor, causes the electronic device to perform:

performing, by the independent frame interpolation chip, frame interpolation processing on the first target area.

16. The non-transitory readable storage medium according to claim 13, wherein the program or the instruction, when executed by the processor, causes the electronic device to perform:

obtaining, by the AP master chip, the to-be-displayed video surface and a UI surface that is displayed on the to-be-displayed video surface;

performing, by the AP master chip, area division on a screen display area, to obtain Y areas, wherein each of the Y areas is an area in the screen display area, and Y is a positive integer greater than 1; and performing, by the AP master chip, area division on the video surface, to obtain the M areas, wherein each of the M areas is an area in the video surface.

17. The non-transitory readable storage medium according to claim 13, wherein the program or the instruction, when executed by the processor, causes the electronic device to perform:

in a case that the UI surface is displayed on the video surface displayed in the AP master chip, determining a second target area in the M areas as the frame interpolation area according to attribute information of the UI surface, wherein the second target area is an area in which there is no overlapping between the video surface and the UI surface and that is in the M areas, and the attribute information of the UI surface comprises a position and an area of the UI surface on the video surface; and the program or the instruction, when executed by the processor, causes the electronic device to perform:

determining, by the independent frame interpolation chip, the frame interpolation area from the M areas according to the second target area, and performing frame interpolation processing on the frame interpolation area.

*  *  *  *  *